Jan. 16, 1951

R. G. LE TOURNEAU 2,538,371

MOBILE CIRCULAR TREE SAW

Filed Oct. 16, 1946

INVENTOR
R. G. Le Tourneau

ATTORNEYS

Patented Jan. 16, 1951

2,538,371

UNITED STATES PATENT OFFICE 2,538,371

MOBILE CIRCULAR TREE SAW

Robert G. Le Tourneau, Peoria, Ill., assignor to R. G. Le Tourneau, Inc., Stockton, Calif., a corporation of California Application October 16, 1946, Serial No. 703,575

6 Claims. (Cl. 143—43)

This invention is directed generally to logging equipment, and particularly to a novel, power actuated, self-propelled tree saw which is wheel-supported for guided travel and manipulation in the woods; the implement being operative to saw off trees closely adjacent the ground.

The implement is characterized by a novel power-driven, circular saw unit mounted for selective adjustment—as conditions may require —vertically, longitudinally of the implement, or angularly relative to a normal position with the circular saw disposed horizontally.

The implement is further characterized by the inclusion therein of a wheel-supported elevator frame having a vertically movable elevator carriage thereon, a boom extending lengthwise of the direction of travel mounted on the carriage for adjustment in said direction, and a power driven circular saw unit mounted on the outer end of the boom some distance beyond the wheels which support the elevator frame.

Another distinguishing characteristic of this invention is the provision, on the implement, of separate electric power units corresponding to the separate adjustable parts; such units being selectively controlled by the operator of the implement from his station thereon.

A further object of the invention is to provide a practical tree saw, and one which will be exceedingly effective for the purpose for which it is designed.

These objects are accomplished by means of such structure and relative arrangement of parts as will fully appear by a perusal of the following specification and claims.

Figure 1:
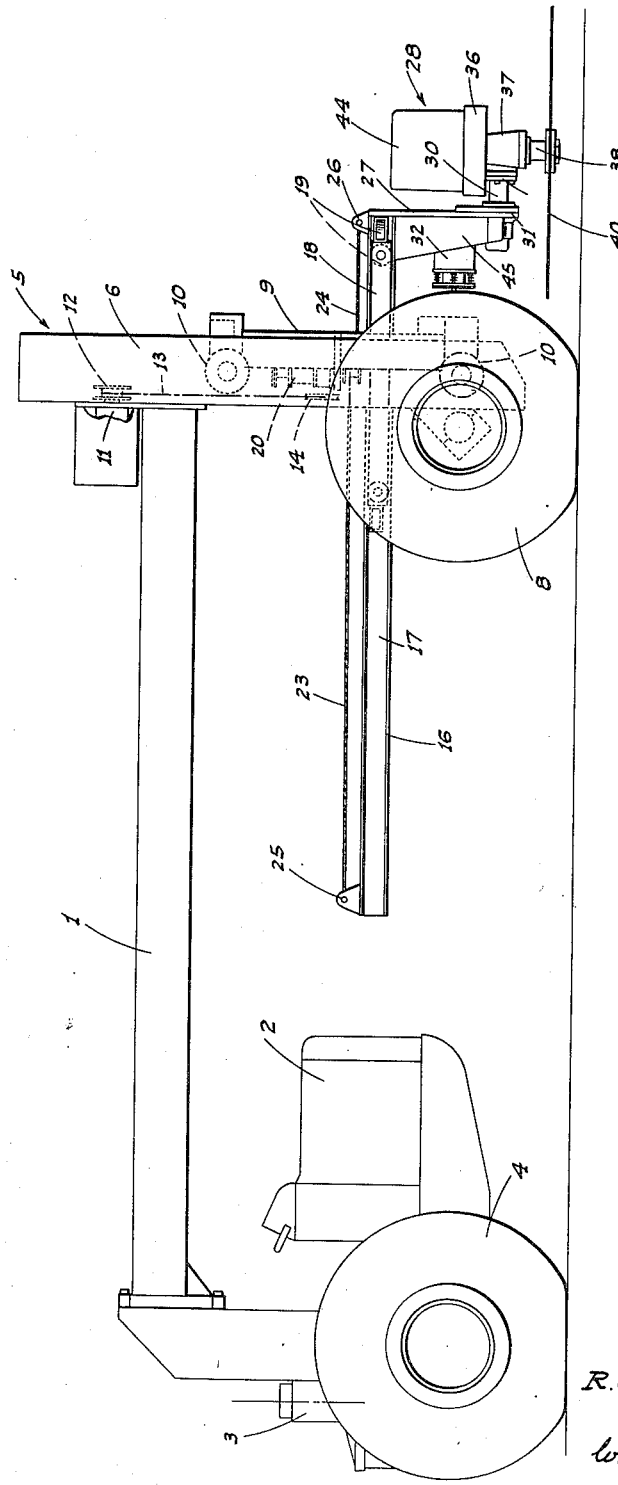
Fig. 1 is a side elevation of the implement, ready for use.
Figure 2:
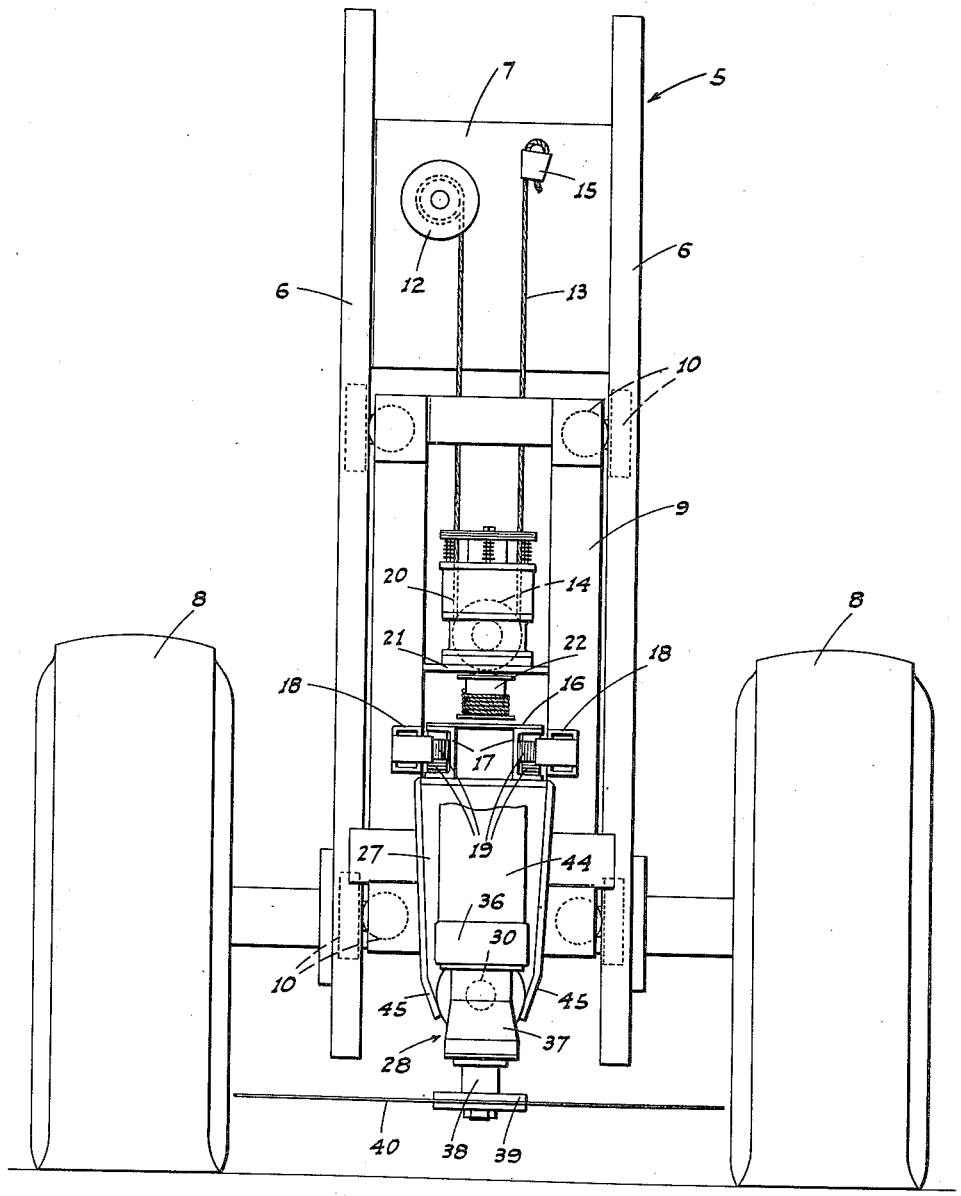
Fig. 2 is an enlarged rear end view of the implement.

Referring now more particularly to the characters of reference on the drawings, the implement comprises a rigid elongated body 1 disposed some distance above ground and connected, at one end, with a two-wheel tractor 2 by means of a coupling and power steering unit 3; said unit being arranged so that the tractor, which includes supporting wheels 4, may either face toward the opposite end of the body 1, or away therefrom. The tractor 2 normally faces said opposite end of the body 1 when the implement is in use sawing trees, but faces in the other or forward direction for travel when the circular saw unit is not in use.

At the end opposite the tractor 2 the rigid body 1 is fixed in connection with an upstanding elevator frame, indicated generally at 5. Said elevator frame includes transversely spaced, vertical side beams 6 connected together by suitable framing, including a top cross plate 7. The elevator frame 5 is supported, at its lower end, by a pair of transversely spaced wheels 8 disposed outside the side beams 6.

A vertically movable elevator carriage 9 is mounted in connection with the frame by means including guide rollers, indicated generally at 10, and said carriage is vertically adjustably actuated as follows:

A reversible electric winch unit 11 is mounted on the cross plate 7, and includes a cable drum 12 disposed out of the path of movement of the upper portion of said elevator carriage 9. A cable 13 is connected to the drum 12, and thence extends downwardly about a direction-changing sheave 14 on the carriage at the back, and from said sheave extends upwardly to an anchor 15 on said cross plate 7. Upon reversible rotation of the drum 12 the cable 13 will be relatively shortened or lengthened, resulting in raising or lowering, respectively, of the elevator carriage 9.

An elongated horizontal boom 16 extends through the carriage 9 and projects outwardly therefrom lengthwise of the direction of travel of the implement to a selectively adjustable extent; said boom being mounted and adjusted as follows:

The boom 16 is formed with laterally, outwardly facing channels 17, on opposite sides thereof, and runs between a pair of transversely spaced, longitudinal guide bars 18 fixed horizontally on the carriage 9; said guide bars including, adjacent opposite ends thereof, vertical and horizontal axis rollers 19 which run in the channels 17 in supporting and guiding relation to the boom 16.

A reversible electric winch unit 20 is affixed on the elevator carriage 9 for movement therewith, said winch unit 20 being supported on a base plate 21, and including a vertical-axis drum 22 disposed below said base plate. A cable is wound on the drum 22, and includes reverse or opposite cable reaches 23 and 24 which extend along the boom 16 to opposite ends thereof, where said reaches are anchored at 25 and 26, respectively. Upon rotation of the drum 22 in one direction or the other, the boom 16 is either advanced or retracted by the above described arrangement. In this manner the extent of projection of said boom outwardly, from the elevator frame 5 in the direction of travel, is under the selective control of the operator of the tractor 2.

Figure 3:
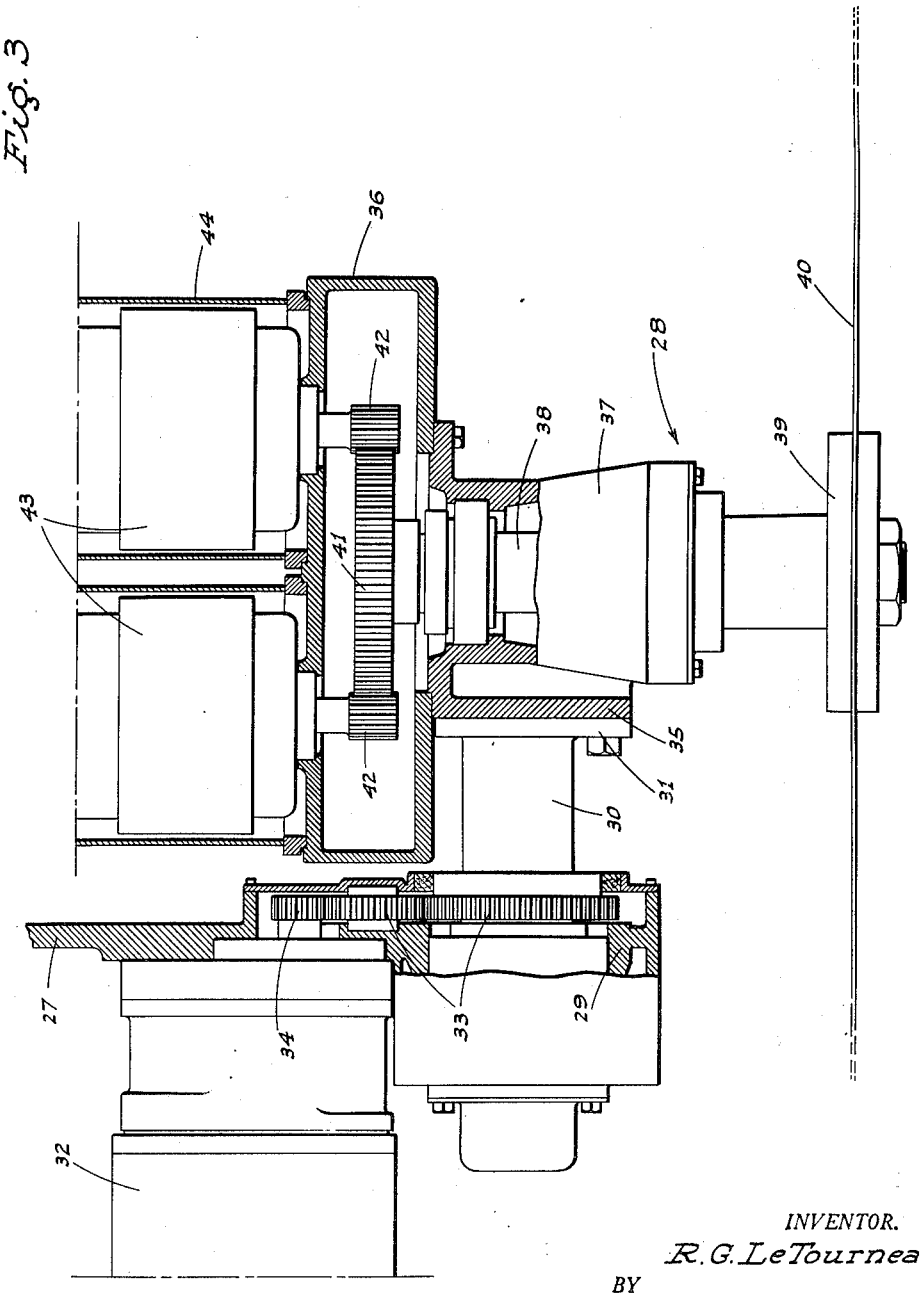
Fig. 3 is an enlarged fragmentary sectional elevation of the power-driven, circular saw unit and its adjustable mount.

At its outer end the boom 16 is fitted with a rigid, depending bracket 27 on which a power-driven, circular saw unit, indicated generally at 28, is adjustably mounted in the following manner:

The circular saw unit, as indicated generally at 28, is shown in detail in Fig. 3, and comprises the following:

At its lower end the bracket 27 is formed with a journal box or case 29 which carries a horizontal heavy-duty shaft 30 extending lengthwise of the direction of travel and projecting outwardly to a termination in an attachment head 31. The rotative position of the shaft 30 is adjustable through the medium of a reversible electric actuator 32 mounted on the bracket 27 above the journal box 29, and connected in rotative or adjustable relation to the shaft 30 through the medium of a gear train 33 driven by the drive pinion 34 of the actuator 32.

The attachment head 31 is fixed in connection with a matching, depending attachment plate 35 formed on a gear case 36, which gear case 36 includes a depending neck 37. A heavy-duty vertical spindle 38 is journaled in the neck 37 and extends upwardly into the gear case 36, and downwardly to a termination below said neck. Below the neck 37 the spindle 38 includes an arbor 39 carrying a large-diameter circular saw 40. The circular saw 40 is normally in a horizontal or vertical-axis position.

Within the gear case 36 the spindle 38 is fitted with a main drive gear 41 driven, on opposite sides, by pinions 42 of a pair of vertical-axis electric motors 43 mounted one ahead of the other on top of said gear case 36, and enclosed within a housing 44. The neck 37 is protected, on opposite sides, by guards or shields 45.

When the above described power-driven, self-propelled tree saw is in use, it is readily manipulated through the woods by the tractor 2, which is steerable relative to the body 1. The implement is advanced toward the tree to be cut, and the elevation of the carriage 9 and projection of the boom 16 is adjusted to desired position. Thereafter, the boom is advanced, causing the circular saw 40 to cut through the trunk of a tree, which cutting operation is accomplished effectively and rapidly. As dual electric motors 43 are employed to drive the saw 40, ample power is applied to the latter, and yet the lateral space occupied by the motor means is not great, for the reason that said motors are disposed one ahead of the other, as previously described.

In certain cases it may be desirable to first make an undercut on the tree on one side prior to the sawing operation on the other. To make such an undercut the circular saw 40 is adjusted to an angular position with respect to parallel, and then an angle cut is made in the trunk of the tree, followed with a horizontal cut to complete the undercutting operation. The circular saw 40 is angularly adjusted by operation of the reversible electric actuator 32, which causes turning of the shaft 30, with resultant angular adjustment of the entire saw unit 28.

By reason of the fact that the saw unit 28 is adjustable vertically; lengthwise of the implement; and angularly; selectively, the implement is operative to produce any desired type of cut, thus being very flexible in its adaptation to logging operations.

The reversible electric winches 11 and 20, together with the reversible electric actuator 32, are incorporated in an operating circuit (not shown) which includes control switches accessible to the operator of the tractor 2; such circuit being energized by a generator driven by the tractor engine. Said winches and actuator are of a type wherein each includes a normally set brake, which brake automatically releases when the electric power is applied for the operation of such winches or actuator.

From the foregoing description it will be readily seen that there has been produced such a device as substantially fulfills the objects of the invention as set forth herein.

While this specification sets forth the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A power actuated tree saw comprising the combination of: a tractor, an elongated rigid body supported at one end by the tractor, an upstanding elevator frame rigidly fixed to the other end of said body at substantially right angles thereto, wheels supporting the elevator frame at its lower end, an elevator carriage mounted for vertical movement in the elevator frame, power means for effecting such vertical movement of the carriage, a pair of horizontally disposed channel irons having their open sides in facing relation, such channels extending through the carriage at substantially right angles thereto, guide elements on the carriage including rollers projecting into said channel irons and supporting the same, a power winch mounted on the carriage, a cable connected at each end to one end of the channel irons and connected in driving relation with the winch to effect back and forth movement of the channel irons relative to the carriage upon operation of the winch, and a driven saw unit supported on the outer end of the channel irons.

2. A mobile saw including an elongated high-level horizontal body, a ground engaging support for the body at its inner end, a wheel-supported elevator frame rigid with and mainly depending from the body at its outer end, a carriage mounted in the elevator frame for vertical movement, a horizontal boom mounted in the carriage for horizontal movement relative thereto lengthwise of and below the body and for vertical movement with the carriage, and a vertical axis circular power driven saw mounted on the outer end of the boom.

3. A mobile saw including an elongated high-level horizontal body, a ground engaging support for the body at its inner end, a wheel-supported elevator frame rigid with and mainly depending from the body at its outer end, said elevator frame including transversely spaced uprights, a carriage mounted between the uprights for guided vertical movement, a horizontal boom extending through the carriage lengthwise of and below the body, means on the carriage supporting and guiding the boom for horizontal movement relative to and vertical movement with the carriage, and a vertical-axis power driven saw mounted on the outer end of the boom.

4. A power actuated tree saw comprising the combination of: a tractor, an elongated rigid body supported at one end by the tractor, an upstanding elevator frame rigidly fixed to the other end of said body at substantially right angles thereto, wheels supporting the elevator frame at its lower end, an elevator carriage mounted for vertical movement in the elevator frame, power means for effecting such vertical movement of the carriage, and a power driven saw unit carried by the carriage and movable therewith; the saw unit including a pair of horizontally disposed rails, guide means on the elevator carriage, such guide means supporting the rails for reciprocating movement relative to such carriage, power means for effecting such reciprocating movement of the rails, a saw mounted on the outer end of the rails, and power means operative to drive the saw.

5. A power actuated tree saw comprising the combination of: a tractor, an elongated rigid body supported at one end by the tractor, an upstanding elevator frame rigidly fixed to the other end of said body at substantially right angles thereto, wheels supporting the elevator frame at its lower end, an elevator carriage mounted for vertical movement in the elevator frame, power means for effecting such vertical movement of the carriage, and a power driven saw unit carried by the carriage and movable therewith; the saw unit including a pair of horizontally disposed rails, guide means on the elevator carriage, such guide means supporting the rails for reciprocating movement relative to such carriage, power means for effecting such reciprocating movement of the rails, a bracket secured on and projecting at substantially right angles to the outer ends of said rails, a horizontally disposed shaft journaled in the bracket, power means carried by the bracket and connected in driving relation to the shaft, a support fixed on the outer end of the shaft and turnable therewith, a saw mounted in the support, and power means mounted on the support and connected in driving relation with the saw.

6. A combination, as in claim 5, in which the support includes a gear case containing gears, a spindle fixed with one of said gears, journaled in the gear case and projecting therefrom, the saw being fixed to the outer end of the spindle, and a reversible electric motor mounted on the gear case and connected in direct driving relation with the gears.

ROBERT G. LE TOURNEAU.

REFERENCES CITED

The following references are of record in the file of this patent:

UNITED STATES PATENTS

| Number | Name | Date |
|---|---|---|
| 638,553 | Burke | Dec. 5, 1899 |
| 827,548 | Martin | July 31, 1906 |
| 906,714 | Hoovestol | Dec. 15, 1908 |
| 1,318,324 | Keon | Oct. 7, 1919 |
| 1,414,319 | Zaiauskis | Apr. 25, 1922 |
| 1,530,779 | Le Tourneau | Mar. 24, 1925 |
| 1,556,013 | Heath | Oct. 6, 1925 |
| 1,602,357 | Georgelis | Oct. 5, 1926 |
| 1,670,007 | Rasmussen et al. | May 15, 1928 |
| 1,748,446 | Gatzsch | Feb. 25, 1930 |
| 2,029,335 | Oberhoffken et al. | Feb. 4, 1936 |
| 2,142,303 | Crouch | Jan. 3, 1939 |
| 2,242,336 | Atwood | May 20, 1941 |
| 2,354,625 | Van Sickle | July 25, 1944 |
| 2,365,408 | Hillyer | Dec. 19, 1944 |
| 2,406,300 | Le Tourneau | Aug. 20, 1946 |
| 2,411,623 | Jaques | Nov. 26, 1946 |